United States Patent
Compton

(10) Patent No.: US 10,783,741 B2
(45) Date of Patent: Sep. 22, 2020

(54) GAMING SYSTEMS, DEVICES AND METHODS FOR DYNAMIC SYMBOL SUBSTITUTION

(71) Applicant: KING SHOW GAMES, INC., Minnetonka, MN (US)

(72) Inventor: Nicholas Compton, Crystal, MN (US)

( * ) Notice: Subject to any disclaimer, the term of this patent is extended or adjusted under 35 U.S.C. 154(b) by 10 days.

(21) Appl. No.: 16/173,656

(22) Filed: Oct. 29, 2018

(65) Prior Publication Data

US 2019/0130696 A1   May 2, 2019

Related U.S. Application Data

(60) Provisional application No. 62/580,046, filed on Nov. 1, 2017.

(51) Int. Cl.
| | |
|---|---|
| *G06F 17/00* | (2019.01) |
| *G07F 17/32* | (2006.01) |
| *G06F 7/58* | (2006.01) |

(52) U.S. Cl.
CPC ...... *G07F 17/3213* (2013.01); *G07F 17/3262* (2013.01); *G07F 17/3267* (2013.01); *G06F 7/588* (2013.01)

(58) Field of Classification Search
CPC ... G07F 17/3213; G07F 17/3244; G07F 17/34
See application file for complete search history.

(56) References Cited

U.S. PATENT DOCUMENTS

| | | | |
|---|---|---|---|
| 8,096,869 B2 | 1/2012 | Yoshimi | |
| 8,465,358 B2 | 6/2013 | Kemper | |
| 9,022,852 B1 | 5/2015 | Zoble et al. | |
| 9,208,655 B2 | 12/2015 | Aida et al. | |
| 9,214,066 B2 | 12/2015 | Collette et al. | |
| 9,330,527 B2 | 5/2016 | Collette et al. | |
| 2004/0214629 A1* | 10/2004 | Walker | G07F 17/32 463/20 |
| 2007/0225060 A1* | 9/2007 | Yoshimura | G07F 17/3244 463/20 |
| 2009/0163268 A1 | 6/2009 | Lyons et al. | |
| 2009/0227332 A1 | 9/2009 | Yoshizawa | |
| 2012/0083327 A1* | 4/2012 | Zobel | G07F 17/3213 463/20 |
| 2013/0184050 A1* | 7/2013 | Zoble | G07F 17/3213 463/20 |
| 2015/0235511 A1* | 8/2015 | Zoble | G07F 17/3213 463/20 |
| 2016/0335842 A1* | 11/2016 | Zoble | G07F 17/3213 |

* cited by examiner

Primary Examiner — Lawrence S Galka

(57) ABSTRACT

Systems, apparatuses and methods for enhancing or otherwise modifying gaming indicia sources, such as slot game reels sourcing slot games, poker decks sourcing poker hands, etc. Slot game embodiments involve replacing or modifying symbols with new or transformed symbols on a slot game event basis, such as on a spin-by-spin basis. Multiple sets of different symbol replacement instructions may be provided, such that selection of one of the sets will cause different modifications to the slot reels than had another set been selected. Embodiments enable such selection and reel variation on a spin-by-spin basis in slot games.

19 Claims, 11 Drawing Sheets

TABLE-A

| CASE | SYMBOL TO CHANGE | # SYMBOLS UPGRADED TO DOUBLE SYMBOLS ||||| WEIGHT |
|---|---|---|---|---|---|---|---|
| | | REEL1 | REEL2 | REEL3 | REEL4 | REEL5 | |
| 1 | M1 | 0 | 2 | 2 | 2 | 2 | 24 |
| | M2 | 5 | 0 | 0 | 1 | 2 | |
| 2 | M1 | 2 | 0 | 2 | 2 | 2 | 24 |
| 3 | M2 | 0 | 2 | 2 | 2 | 2 | 24 |
| 4 | M2 | 2 | 0 | 2 | 2 | 2 | 24 |
| | M3 | 0 | 0 | 1 | 1 | 1 | |
| 5 | - | 0 | 0 | 0 | 0 | 0 | 4 |

FIG. 5A

TABLE-B

| REEL1 | REEL2 | REEL3 | REEL4 | REEL5 |
|---|---|---|---|---|
| M1 | F7 | M1 | M1 | M1 |
| M2 | F8 | M2 | M2 | M2 |
| M3 | F9 | M3 | M3 | M3 |
| M4 | FA | M4 | M4 | M4 |
| F5 | M1 | F5 | F5 | F5 |
| F6 | M2 | F6 | F6 | F6 |
| F7 | M3 | F7 | F7 | F7 |
| F8 | M4 | F8 | F8 | F8 |
| F9 | F5 | F9 | F9 | F9 |
| FA | F6 | FA | FA | FA |
| M1 | F7 | M1 | M1 | M1 |
| M2 | F8 | M2 | M2 | M2 |
| M3 | F9 | M3 | M3 | M3 |
| M4 | FA | M4 | M4 | M4 |
| F5 | M1 | F5 | F5 | M1 |
| F6 | M2 | F6 | F6 | M2 |
| F7 | M3 | F7 | F7 | M3 |

FIG. 5B

TABLE-C

| REEL1 | REEL2 | REEL3 | REEL4 | REEL5 |
|---|---|---|---|---|
| D1 | F7 | D1 | D1 | D1 |
| M2 | F8 | M2 | M2 | M2 |
| M3 | F9 | M3 | M3 | M3 |
| M4 | FA | M4 | M4 | M4 |
| F5 | M1 | F5 | F5 | F5 |
| F6 | M2 | F6 | F6 | F6 |
| F7 | M3 | F7 | F7 | F7 |
| F8 | M4 | F8 | F8 | F8 |
| F9 | F5 | F9 | F9 | F9 |
| FA | F6 | FA | FA | FA |
| D1 | F7 | D1 | D1 | D1 |
| M2 | F8 | M2 | M2 | M2 |
| M3 | F9 | M3 | M3 | M3 |
| M4 | FA | M4 | M4 | M4 |
| F5 | M1 | F5 | F5 | M1 |
| F6 | M2 | F6 | F6 | M2 |
| F7 | M3 | F7 | F7 | M3 |

GAMING SYSTEMS, DEVICES AND METHODS FOR DYNAMIC SYMBOL SUBSTITUTION

FIELD

This disclosure relates generally to games, and more particularly to systems, apparatuses and methods for enhancing, transforming, or replacing symbols in a gaming symbol grid in gaming devices.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever-wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to replace symbols in a gaming symbol grid on for each gaming event.

In accordance with one representative embodiment, a slot game apparatus is provided. The apparatus includes a reel set having multiple reels, each reel having various symbols associated therewith. A plurality of selectable symbol substitution sets is also provided, such as in a local or remote storage, where each of the symbol substitution sets identifies a target symbol(s) of the reel set that is targeted for replacement, and where each of the symbol substitution sets also specifies a number of the target symbols to replace on each of the reels. The representative apparatus further includes a random event selection module that is configured to select one of the selectable symbol substitution sets, and in response thereto, to retrieve and/or otherwise identify the target symbols and the specified number of the target symbols to replace from the selected symbol substitution set. Such an apparatus may further include a symbol replacement module, configured to replace the specified number of the target symbols on each respective one of the plurality of reels with replacement symbols.

In one embodiment, the random event selection module may be configured to select any one of the plurality of symbol substitution sets in connection with each randomization and presentation of the reel set (e.g., in connection with each reel spin event). In a more particular embodiment, the random event selection module is configured to select any one of the plurality of symbol substitution sets based on assigned relative likelihoods of selection among the various symbol substitution sets. For example, some of the symbol substitution sets may be weighted such that they are more likely to be selected than other ones of the symbol substitution sets. In an alternative particular embodiment, the random event selection module may be configured to randomly select any one of the plurality of symbol substitution sets. Such random selection may be a fair/equal selection among the symbol substitution sets rather than a weighted selection as in other embodiments.

Another variation of such a slot game apparatus involves resetting the reel strips to their original configuration (e.g., a reel strip configuration prior to the modification of one or more reel strips based on a symbol enhancement/replacement). In one embodiment, this resetting of the reel strips is implemented prior to the next selection by the random event selection module. Thus, in some embodiments, the symbol replacement is performed for one or more particular reel spins or other gaming events, and is not a persistent change to the reel strips, but rather a temporary change.

In another variation, one or more of the symbol substitution sets may also include information specifying particular target symbols among a total of the target symbols in the reel set to be replaced. For example, where five target symbols are to be replaced on a first of five reels of the reel set, but there are twenty such symbols on the first reel, the selected symbol substitution set may include information as to which five of the twenty target symbols on that first reel should be replaced. This could be a random selection (e.g., any five of the twenty), or could be guided to tend to select particular target symbols among the total target symbols (e.g., replace symbols having proximity characteristics on the reel), or the like.

Another variation of the slot game apparatus involves including information in one or more of the symbol substitution sets that specifies particular positions on the plurality of reels in which the retrieved identified target symbols are to be positioned in place of the symbols originally at those particular positions. For example, in one representative example, the information in a selected symbol substitution set might indicate to select the first, fourth, ninth, thirteenth, and twentieth target symbols on the first reel for replacement.

In yet another variation, the symbol replacement module is further configured to apply rules identifying which of a total number of the symbols on each of the plurality of reels are to be replaced by the replacement symbols.

In another representative variation, one or more of the symbol substitution sets further includes an identification of the replacement symbols to be used to replace the target symbols. In an alternative representative embodiment, the replacement symbols may be established prior to the reel spin or other gaming event for each of the target symbols targeted for replacement, and are not provided in the symbol substitution sets. In yet another particular variation, the replacement symbols are derivatives of the target symbols being replaced.

Another variation of such a slot game apparatus involves specifying, via a symbol substitution sets(s), that no symbols on a particular reel(s) of the reel set will involve symbol replacement.

The reel set and associated reels may be physical reels with manners of replacing or overlaying replacement symbols thereon for purposes of presentation and result analysis, or may be virtual reels that are presented based on information stored about the reel symbols and their sequence on each reel.

In yet another embodiment, the random event selection module may be implemented as a random number generator, where each of the symbol substitution sets is associated with a number or range of numbers identifiable by an output of the random number generator.

In accordance with another embodiment, a slot game device is provided that includes a display presenting a slot game grid, and slot game reels each having symbols associated therewith, where some portion of the slot game reels is presented via the slot game grid. A user interface includes at least one user input to enable a player to initiate a slot game event presented via the slot game grid. A wager input device is provided and structured to identify and validate player assets, and to permit the player to play the slot game event when the player assets are provided. The slot game device includes a processing arrangement configured to make a selection among multiple symbol substitution sets, each of which identifies at least one target symbol targeted for replacement and a number of the target symbols to replace, on each of the reels identified in the selected symbol substitution set. The processing arrangement is further configured to replace that number of the target symbols with replacement symbols on each of the reels as governed by the selected symbol substitution set. The processing arrangement identifies any winning symbol combinations and corresponding awards from the reels as modified by the replacement symbols and displayed via the slot game grid in response to a "reel spin" or other randomization of the reel symbols. The replacement symbols may be removed from the reels prior to player participation in a subsequent one of the slot game events.

In a variation of such a slot game device, each of the symbol substitution sets is assigned a likelihood of being selected relative to the other symbol substitution sets, where the processor is configured to select from the symbol substitution sets pursuant to the assigned likelihoods of being selected.

In accordance with another embodiment, a slot game device is provided that includes a display presenting a slot game grid, a user interface having a user input(s) to facilitate player initiation of a slot game event presented via the slot game grid, and a wager input device structured to identify and validate player assets and permit the player to play the slot game event when the player assets are provided. The slot game device also includes reel storage configured to store associated reels of a slot game, where each of the reels may have various consecutive symbols associated therewith. The slot game device further includes symbol substitution set storage that is configured to store a symbol substitution set identifying one or more target symbols on one or more of the reels to be replaced with one or more replacement symbols, and specifying a number of the target symbols to be replaced on each of the reels. A processor is configured to retrieve the stored symbol substitution set in response to a signal initiating replacement of the target symbols on the reels with the replacement symbols of the symbol substitution set. The processor is further configured to locate the target symbols on each of the reels as identified in the symbol substitution set, and to locate a quantity of the target symbols on each reel corresponding to the specified number of the target symbols to be replaced as identified in the symbol substitution set. The processor further replaces the quantity of located target symbols with the replacement symbols for use in a slot game event, and in response thereto, to identify winning symbol combinations and corresponding awards on the reels as modified by the replacement symbols. In one embodiment, the processor is configured to (e) reset each of the reels to their original state in response to player participation in the slot game event, and the symbol replacement process may be repeated in response to further occurrences of the signal.

In a more particular embodiment of such a slot game device, the symbol substitution set storage is configured to store multiple alternative symbol substitution sets, each of which identifies respective target symbols and specifies a respective number of the target symbols to be replaced on each of the reels. In such an embodiment, the processor may be configured to select one of the symbol substitution sets in response to the signal, to retrieve the selected symbol substitution set, and to carry out the symbol replacement process based on that selected symbol substitution set.

In another particular representative embodiment of such a slot game device, the signal is provided randomly in connection with the slot game event, where in an alternative representative embodiment, the signal is provided in response to an event associated with participation in the slot game event.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

BRIEF DESCRIPTION OF THE DRAWINGS

FIGS. 5A, 5B and 5C depict a representative symbol substitution bank, an original symbol set, and a modified symbol set resulting from application of the symbol substitution bank to the original symbol set.

DETAILED DESCRIPTION

Figure 1:
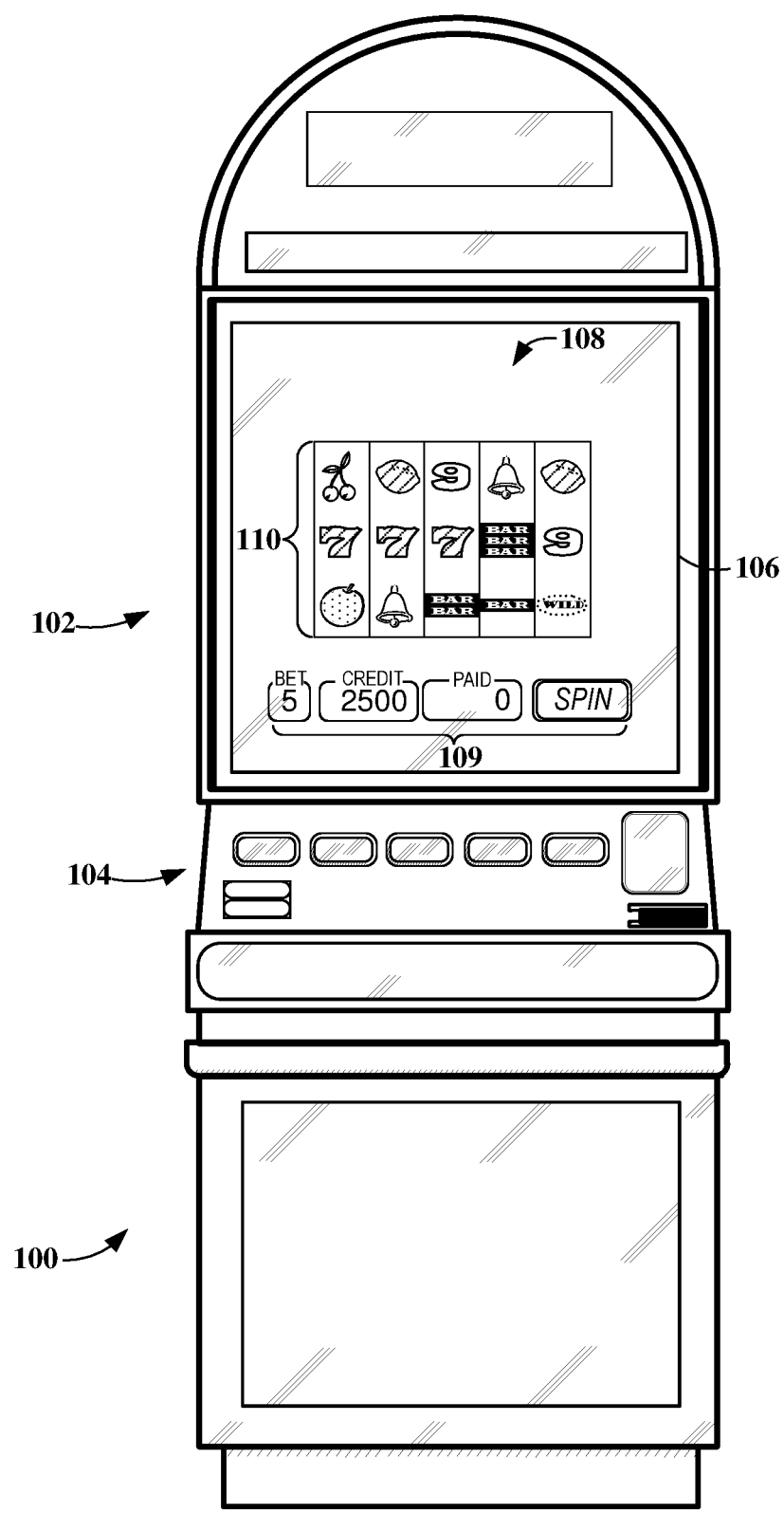
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods for dynamically replacing or modifying symbols with new or transformed symbols on a game event-to-event basis (e.g., reel spin-to-spin basis). The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that involves replacing symbols to be provided on a slot game grid with new or transformed symbols on a spin-per-spin basis.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some example embodiments illustrated herein, the primary gaming portion 108 may display a grid (or equivalent arrangement) of game elements 110 or game element positions (also referred to herein as "reel stop positions"). As illustrated in the embodiment shown in FIG. 1, the grid includes three rows and five columns of game elements 110, which may form a game outcome(s) of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as pay tables, navigation controls, etc.

Figure 2:
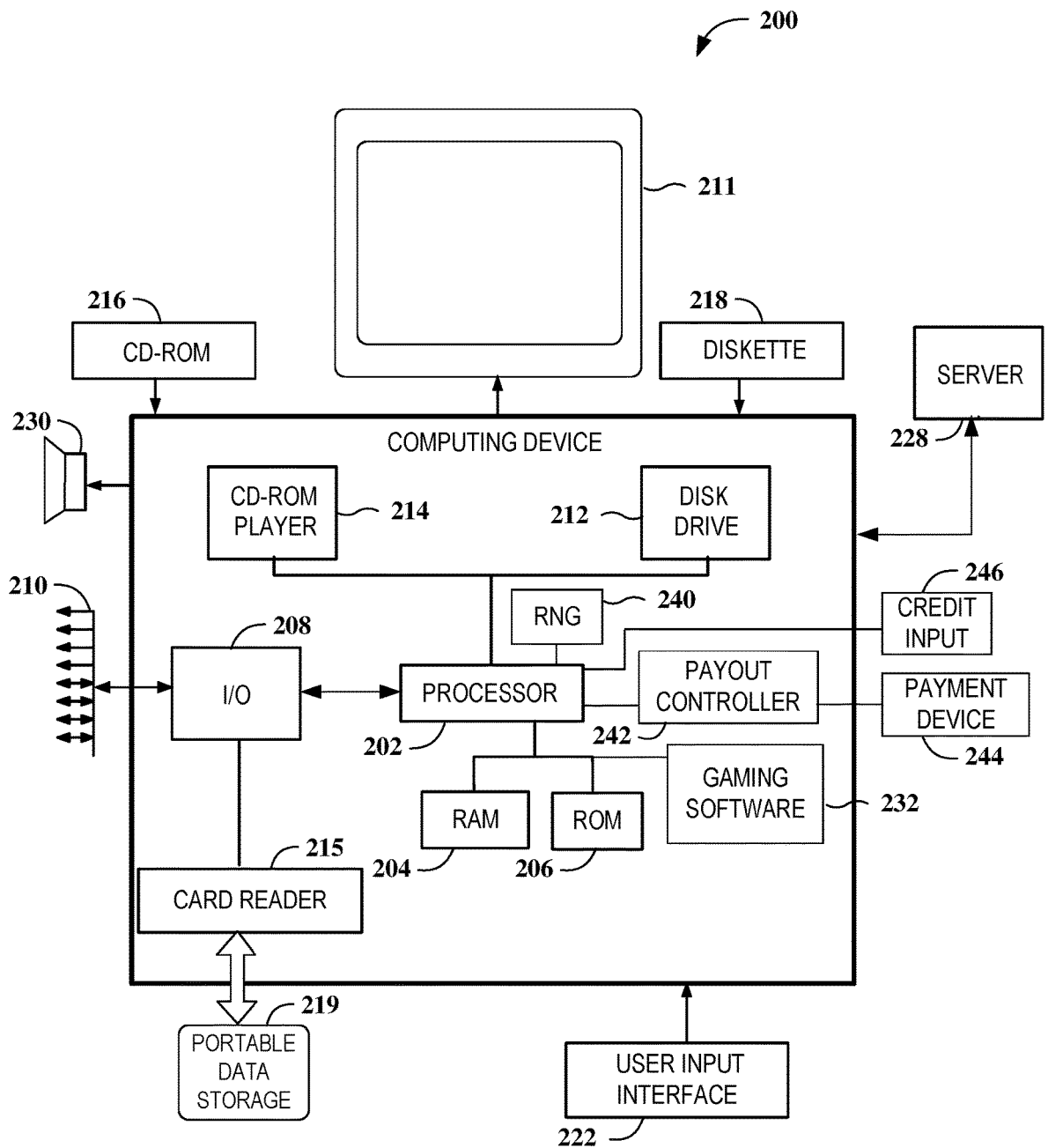
FIG. 2 is a block diagram illustrating a representative computing arrangement capable of implementing games and features in accordance with the invention and representative embodiments described herein.

Although FIG. 1 illustrates a particular implementation of some of the embodiments of this invention in a casino or electronic gaming machine ("EGM"), one or more devices may be programmed to play various embodiments of the invention. The concepts and embodiments described herein may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor, such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like. The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot-based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, symbols are dynamically replaced or modified with new or transformed symbols on a game event-to-event basis. In the context of a slot game, symbols on physical or virtual reels may be changed to other symbols, whereby the change is made on the reels before the reels populate the slot game grid with a matrix of symbols. In some embodiments, symbols are changed to any other symbol, where in other embodiments the symbols are changed to another symbol that has some relationship to the prior symbol. One embodiment involves randomly selecting, before or otherwise in connection with each reel spin (e.g., before, during, after etc.), a symbol or a set of symbols as well as a placement map determining where those symbols are, and then changing the symbol or set of symbols to other symbols for that reel spin. One example of changing the symbol involves changing the symbol to another symbol that has a common characteristic with the prior symbol, such as changing that particular symbol to a double of that particular symbol (e.g., changing a "J" symbol to a "JJ" symbol).

Many embodiments may be described in terms of a slot game, where symbols are matched on paylines to determine payout awards. However, the principles described herein are equally applicable to other games of chance, as described herein and as will be readily apparent to those skilled in the art from the teachings herein.

A representative embodiment is now described. In connection with each reel spin in a slot game, a random selection is made that selects a single symbol, or a single set of symbols such as two different symbols, M1 and M2. A placement map may also be created, to identify the quantity and location of symbols on the reels that are the target of replacement. The symbol or set of symbols are then changed to other symbols for that reel spin. For example, where a random selection of a set of symbols, M1 and M2, are randomly selected for symbol replacement, the M1 symbols may be changed to a double symbol of the M1 symbol (referred to as D1), and the M2 symbols may be changed to a double symbol of the M2 symbol (referred to as D2), for that reel spin.

In other words, at least some of the target symbols are changed to double symbols of themselves for that reel spin, in one embodiment. It allows the existing playable symbols to be changed on a spin-by-spin basis. Another example is that before every reel spin, a random number is drawn which selects a single set of symbols (e.g., M1 & M2) and placement map (e.g., 10 random M1 symbols on reel 2 and 4 random M2 symbols on reel 5 of a five-reel slot game). These single M1's are then changed to D1's (and M2's to D2's) for that spin, where D# represents a double symbol of the same kind. For the next spin, a different symbol or set of symbols may be selected for symbol substitution, or alternatively the same symbol or set of symbols may be again selected, or no symbols may be selected for symbol substitution. Thus, one embodiment involves enabling symbol substitution on a spin-by-spin basis, where in other embodiments the symbol substitution selection may carry on over some number of spins or other gaming events. As for presentation, the player would be seeing the new symbol (e.g., the D1 and D2 symbols in the above example) go by on the reels during each reel spin, for those symbols that were allowed to change, without significantly affecting the gameplay style.

It should be noted that a "reel spin" is one representative manner in which symbols may be presented for gaming activities described herein, such as slot games. However, any manner of providing symbols that may be used in the gaming activity may be employed. For example, any manner of randomizing symbol positions may be accomplished on any grid, array, or otherwise presented, and do not need to be placed on mechanical or electronic "reels." References to "reels" and symbols on reels are provided for facilitating an understanding of described embodiments, such as in a slot game context where mechanical and/or electronic reels are indeed implemented, but the description herein is clearly not limited thereto. Thus, descriptions in connection with "reels" and associated symbol placement therewith are equally applicable to any symbol randomization and presentation.

Figure 3A:
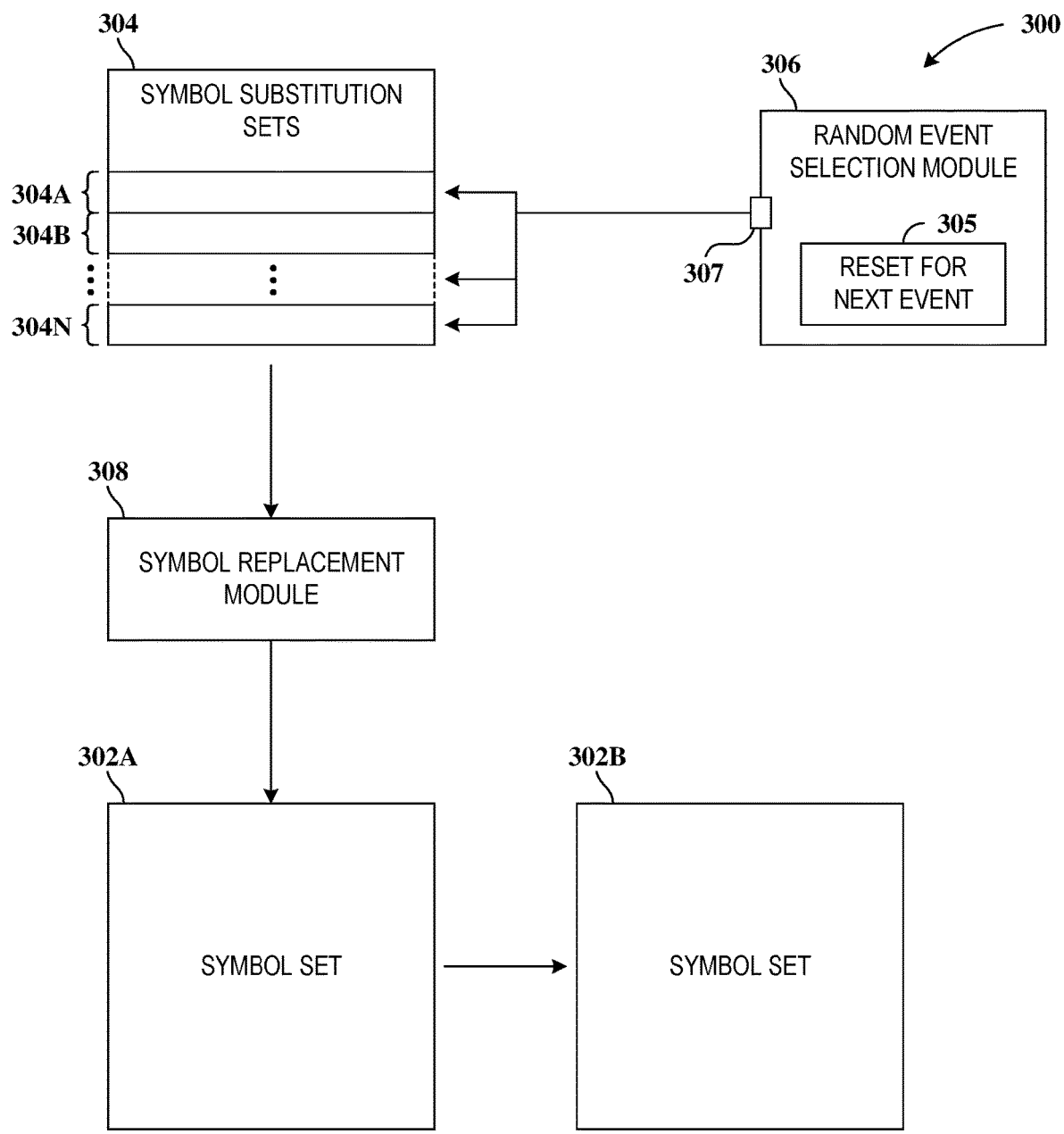
FIGS. 3A and 3B depict representative embodiments of a gaming device having programmed operational modules for performing the gaming symbol substitution functions described herein.
Figure 3B:
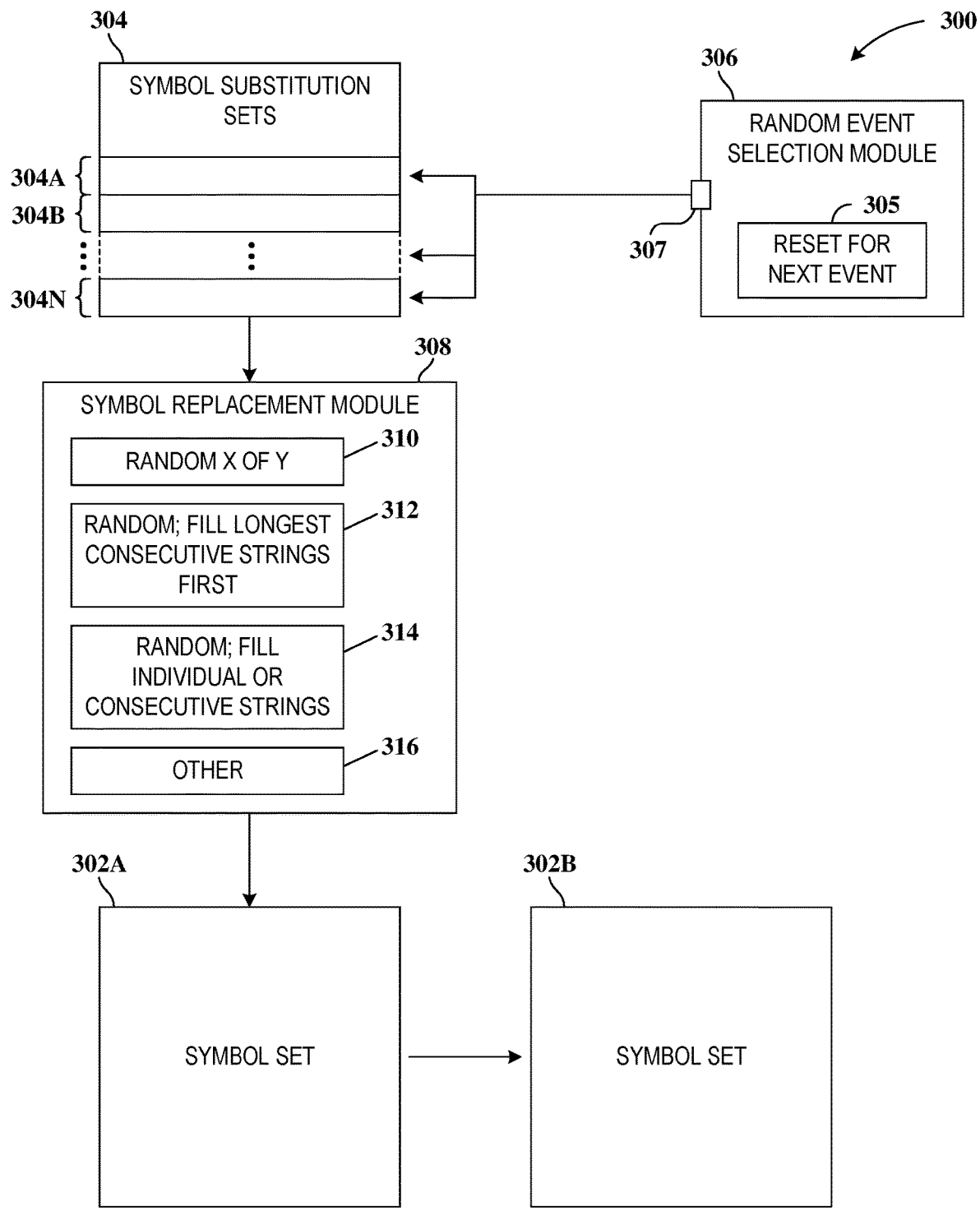

FIGS. 3A and 3B are representative embodiments of an operational arrangement of a gaming device 300 to enhance or otherwise transform particular symbols or other indicia in a game play area. The representative embodiments of FIGS. 3A and 3B and other embodiments described herein may be implemented using processing hardware, storage, software, etc. FIGS. 3A and 3B depict embodiments where a processing arrangement (which is intended to include single processors, multiple processors, or any other processing arrangement) is programmed with software and/or firmware to provide various modules to perform functions described herein.

The illustrated embodiment of FIG. 3A includes a symbol set 302A, which may include a plurality of different symbols or other indicia, including, for example, any one or more of shapes, images, colors, sizes, null/blank positions, etc. These symbols may be presented in any desired fashion, including but not limited to via a plurality of reel strips or reels, such as provided by way of mechanical reels or virtual reels or other physical and/or electronic mechanisms. For example, virtual reels may include a storage structure(s) to maintain symbol selection and placement on reels, and may include or otherwise involve a display to present the reels and symbols in a fashion suitable for the particular game. Such reels or other symbol presentations may assemble or arrange symbols in a pattern (e.g., consecutively on discrete reel strips) in any desired manner, such as positioning symbols in a predetermined manner, random manner, extemporaneous manner, etc. Any manner of providing symbols or other indicia for relative comparison or other use to identify matching patterns, special symbols, or the like may be used with the principles described herein.

For purposes of the representative embodiment of FIG. 3A, it will be assumed that the symbol set 302A includes a plurality of symbol reels (not shown), where each reel has a plurality of symbols or other game indicia, where at least matching symbols on designated paylines may provide awards to the player. A player may play slot games or other gaming activities using the symbols/indicia associated with the symbol set 302A.

In accordance with one embodiment, one or more symbols of the symbol set 302A may be replaced by one or more symbols associated with one of a plurality of available symbol substitution sets 304. For example, the stored symbol substitution sets 304 of FIG. 3A include a plurality of symbol substitution sets 304A, 304B, through some indeterminate number of symbol substitution sets identified as symbol substitution set 304N. One, more or all of the symbol substitution sets 304A, 304B, . . . 304N may include identification of one or more symbols from the symbol set 302A that are to be replaced. For example, a symbol substitution set 304A could include, among other things, identification of a symbol(s) S1, meaning that S1 symbols from the symbol set 302A (e.g., a particular reel of the symbol set 302A) are the target symbols targeted for replacement. Examples of such identification of a symbol(s) targeted for replacement is discussed below, including but not limited to the information in the column "symbol to change" in the symbol substitution bank 500 of FIG. 5A. Such information may be provided, in some embodiments, as part of the symbol substitution bank to identify which symbols are to be replaced from the original slot game symbols to arrive at the modified slot game symbols. In other embodiments, the symbol(s) targeted for replacement in the symbol set 302A may not be provided as part of the symbol substitution bank/sets, as the symbol(s) targeted for replacement in the symbol set 302A may be static and unchanging, whereby the symbol(s) targeted for replacement in the symbol set 302A may be programmed or otherwise predetermined.

In another embodiment, one, more or all of the symbol substitution sets 304A, 304B, . . . 304N may include identification of one or more symbols that will replace one or more symbols from the symbol set 302A. For example, a symbol(s) may be identified indicating which symbol(s) is to be substituted for another symbol(s) on the original slot game reel to arrive at the modified slot game reel. Examples are further described herein, including but not limited to FIG. 4, which identifies the replacement symbol (RS-A) in each of the symbol substitution sets 404A, 404B, . . . 404N. In other embodiments, the replacement symbol(s) may not be provided as part of the symbol substitution bank/sets, as the replacement may be static and unchanging, whereby the symbol(s) to replace other symbols may be programmed or otherwise predetermined.

Each of the symbol substitution sets 304 may additionally or instead include a placement map identifying, to some desired degree, where the replacement symbols from the symbol substitution sets 304 (and/or other identified symbols) will replace symbols from the symbol set 302A. For example, if the symbol set 302A includes five slot game reels, a selected one of the symbol substitution sets 304A, 304B, 304N may include one or more symbols to replace one or more symbols in the symbol set 302A, where in some embodiments the symbol substitution sets 304A, 304B, 304N also include information as to which symbol(s) and/or location(s) in the symbol set 302A to update, as noted above. A placement map may provide, however, specific information as to which of the target symbols in the original symbol set 302A will be replaced, such as to designate some subset of the total number of targeted symbols to replace (e.g., if there are twenty target symbols of type $S_T$ in the symbol set 302A, and some subset such as ten of such $S_T$ symbols are to be replaced by substitute symbols $S_R$, a placement map associated with one, more, or all of the symbol substitution sets 304A, 304B, 304N may be provided to identify which ten of the twenty (i.e. which subset of the total) target symbols are to be replaced. A placement map may alternatively, or additionally, be used to identify the number of symbols to be replaced in the original symbol set 302A.

In the illustrated embodiment of FIG. 3A, a random event selection module 306 represents a software-programmed or otherwise configured hardware module used to select one of the plurality of symbol substitution sets 304A, 304B, 304N. In other embodiments, the random event selection module 306 may alternatively or additionally determine when (e.g., on which slot game spin) a symbol substitution will take place. The random event selection module may be implemented in any desired manner, such as using a hardware or software-based random number generator (RNG) or other analogous module capable of providing outputs in a random fashion, or a weighted fashion, or round-robin or other systematic fashion, or however substitute symbol sets are desired to be selected. In one embodiment, the random event selector is reset 305 for the next spin or other gaming event, such that a different symbol substitution set 304A, 304B, 304N may be selected (randomly or otherwise), if desired.

In one embodiment, the random event selection module 306 is configured to select each of the symbol substitution sets 304A, 304B, through 304N based on static or dynamic probabilities. For example, the random event selection module 306 may be configured to select symbol substitution set 304A 10% of the time, 304B 25% of the time, etc. One or more of the symbol substitution sets 304 may include a "null" set, whereby selection by the random event selection module 306 of that particular symbol substitution set 304 would result in no symbol replacement at the symbol set 302A. In a video-based or other electronic slot game embodiment, the symbol substitution sets 304 may be implemented by storing substitute symbols and associated placement map for each of the symbol substitution sets 304A, 304B, 304N. Thus, in some embodiments, a random event selection module 306 provides an output 307 that identifies one (or in other embodiments more than one) of the plurality of symbol substitution sets 304A, 304B, 304N, in order to retrieve the respective one or more of the substitute symbols and/or symbol set placement map associated therewith.

A symbol replacement module 308 represents a software-programmed or otherwise configured hardware module that may be provided to replace symbols in the symbol set 302A with the symbol substitution set 304 identified by the random event selection module 306. For example, an electronic embodiment including virtual slot game reels, the replacement module 308 can locate the electronically stored electronic reels and associated symbols and positions, and replace those symbols on the reels as identified by the identified substitution symbols as prescribed by an associated identified placement map. Where one or more symbols are replaced, this replacement by the replacement module 308 would then result in a modified symbol set 302B. Thus, in some embodiments, the symbol replacement module 308 is configured to replace symbols in the symbol set 302A with the retrieved substitute symbols at reel positions defined the associated reel placement map, as prescribed by the selected symbol substitution set 304, to arrive at the modified symbol set 302B.

In accordance with one embodiment, the substitution of one or more symbols in the symbol set 302A to arrive at a modified symbol set 302B is available during a single gaming event. For example, in a slot game context, the modified symbol set 302B may be available only for the result of a single "spin" or other discernable, or in some embodiments defined, event. Thus, in such an embodiment, when gaming results are obtained and gaming payouts are provided (if applicable) in connection with a slot game spin event, the next spin may default back to the original symbol set 302A until and unless another replacement is forthcoming as a result of the random event selector 306 selecting another symbol substitution set 304A, 304B, 304N for the replacement module 308 to create a modified symbol set 302B. This ability to potentially select a different symbol substitution set (if any) may be configured into the random event selector 306, such as by way of the module 305 which resets the selection for the next spin, or implemented in any of the modules associated with the gaming device.

In one embodiment, a number of the symbols of the symbol set 302A can be designated for substitution. For example, it may be desired to change ten symbols on a plurality of reels of the symbol set 302A from a first symbol (e.g., Symbol-A) to a second symbol (e.g., Symbol-B). In one embodiment, it may be desirable to make such symbol substitutions by groups of consecutive ones of the first symbol, whether the groups of consecutive first symbols include only one such symbol, or a plurality of such symbols. For example, where ten Symbol-A symbols are to be changed to Symbol-B symbols pursuant to configurations and selection of a symbol substitution set 304, if a group of four consecutive Symbol-B symbols are on a particular reel of the symbol set 302A, all four of those consecutive Symbol-B symbols may be changed, thereby leaving six more Symbol-Bs to be changed. This may be beneficial on reels where stacks of symbols, i.e., a plurality of consecutive identical (or related in other embodiments) symbols, are present and desired to remain as stacks of symbols.

In one embodiment, the selected symbol substitution set 304 may identify a lesser number of replacement symbols than the number of original symbols to which they are to replace. For example, if a selected one of the symbol substitution sets 304A, 304B, 304N indicates to replace ten of twenty original Symbol-A symbols of the symbol set 302A with ten Symbol-B symbols, the replacement module 308 or other module may randomly select ten of the twenty original Symbol-A symbols to replace. In one embodiment, groups of two or more consecutive Symbol-A symbols (e.g., "stacks") may be replaced as a group, as described above, with each of the symbols of that group being counted as one of the ten symbols to be replaced.

In one embodiment, a placement map associated with each of the symbol substitution sets 304 may provide specific positions on reels of the symbol set 302A to replace symbols, such as positions 5 and 21 on reel 1, position 8 on reel 2, etc., where the respective symbol substitution set 304 identifies the replacement symbols. In other embodiments, the placement map may identify one or more symbols of the symbol set 302A to be replaced rather than specific positions on the reel. In yet other embodiments, the substitution of symbols of the symbol set 302A could be random, with some "guidance" (e.g., randomly replace ten of the high-value symbols, where high-value symbols are defined). These and other manners of identifying the symbols to be replaced may be used, either alone or in combination, to ultimately arrive at a modified symbol set 302B.

Among other things, symbol enhancement as described herein provides a level of control over one or more of which symbols, their placement, their relative quantities, and/or other symbol-related factors. In one embodiment, symbol replacement as described herein may increase a number of certain symbols on one or more reels, while maintaining or otherwise controlling winning combinations. This may be accomplished with appropriately-defined symbol substitution sets, and/or also associated rules. For example, a replacement module or other module updating one or more slot game reels based on symbol substitution sets may additionally apply or adhere to rules, whether predefined rules, dynamically-generated rules based on criteria such as game conditions, etc.

FIG. 3B illustrates an example of a rule-based symbol enhancement embodiment, using the representative structure and reference numbers from FIG. 3A. Any symbol substitution set may be selected, such as symbol substitution set 304B, whereby the replacement module 308 assists with applying that symbol substitution set 304B to the original symbol set 302A to create the modified symbol set 302B. In one embodiment, a rule 310 may be applied randomly to cause a first number (X) of a replacement symbol to randomly replace any X original symbols identified in the selected symbol substitution set 304B in the symbol set 302A. For example, if there are twenty star symbols on a reel in the symbol set 302A, the rule 310 may indicate to randomly select five of the twenty star symbols on that reel in which to replace with a replacement symbol. In this embodiment, the target symbols to replace may be randomly selected from the total of such target symbols on the reel(s) to be updated, whether or not such target symbols are associated with consecutive strings of like target symbols. The rule 310 may similarly be used on other reels that are to be updated with one or more replacement symbols, based on the symbol substitution sets 304. In one embodiment, a configuration file may be established to carry out such a rule 310.

In other embodiments, rules may be provided to randomly select among the target symbols on a reel to replace, but to replace randomly selected strings of such target symbols before replacing individual target symbols. For example, as described above, groups of two or more consecutive symbols may be replaced as a group. With the example of rule 312, the replacement of target symbols identified in the symbol set 302A may involve random selection of a plurality of "groups" of one or more consecutive ones of the target symbol, and then to replace symbols of the groups having multiple consecutive symbols first, and in yet another embodiment to replace symbols of the largest groups first, followed by the next largest group, and so forth until replacement could reach individual ones of the target symbols. In this manner, a rule 312 could allow some (or in some cases all) stacks of target symbols to essentially remain stacks of symbols after replacement, but just with the replacement symbols instead of the original symbols.

As an example of rule 312, assume twenty target symbols on a reel of the symbol set 304 are to be enhanced/replaced, and the symbol set 304B is selected, which indicates to change ten target symbols on a first reel of the symbol set 302A. Assume that there are twenty such target symbols on that first reel of the symbol set 302A, which includes one string of four consecutive target symbols, one string of two consecutive target symbols, and fourteen additional single target symbols on that reel (4+2+14=20 total target symbols). With a rule such as rule 312, if the "groups" of four consecutive and two consecutive strings of target symbols were selected from the random selection, then the string of four target symbols would be replaced first, followed by the string of two target symbols, and finally followed by four replacement of individual target symbols, for a total of ten symbol replacements of the twenty available target symbols (i.e. string of four+string of two+four individual=ten replaced symbols of the twenty target symbols present on that reel).

Another representative rule 314 randomly selects target symbols on a target reel for replacement pursuant to the selected one of the symbol substitution sets 304, but if a randomly selected one of the target symbols is associated with a string of such target symbols, then all (or as many as the total count to replace will allow) of the target symbols of that string will be filled. Thus, this embodiment does not give priority to strings of target symbols as was the case for rule 312, but will give priority to filling a consecutive string of target symbols if one of those symbols is one of the randomly-selected target symbols. For example, if ten target symbols on a particular reel are to be enhanced where that reel includes twenty total target symbols, and there is a string of four consecutive target symbols and the rest individual target symbols on that reel, each target symbol will be replaced as they are selected, with the exception that, if possible, all target symbols in a string will be replaced if the target symbol is associated with a string of target symbols. Any other rule 316 may alternatively or additionally be used in a similar manner, and the representative rules 310, 312, 314 are provided as examples of control and/or guidance that may be configured into the symbol enhancement structure and methodology.

Figure 4:
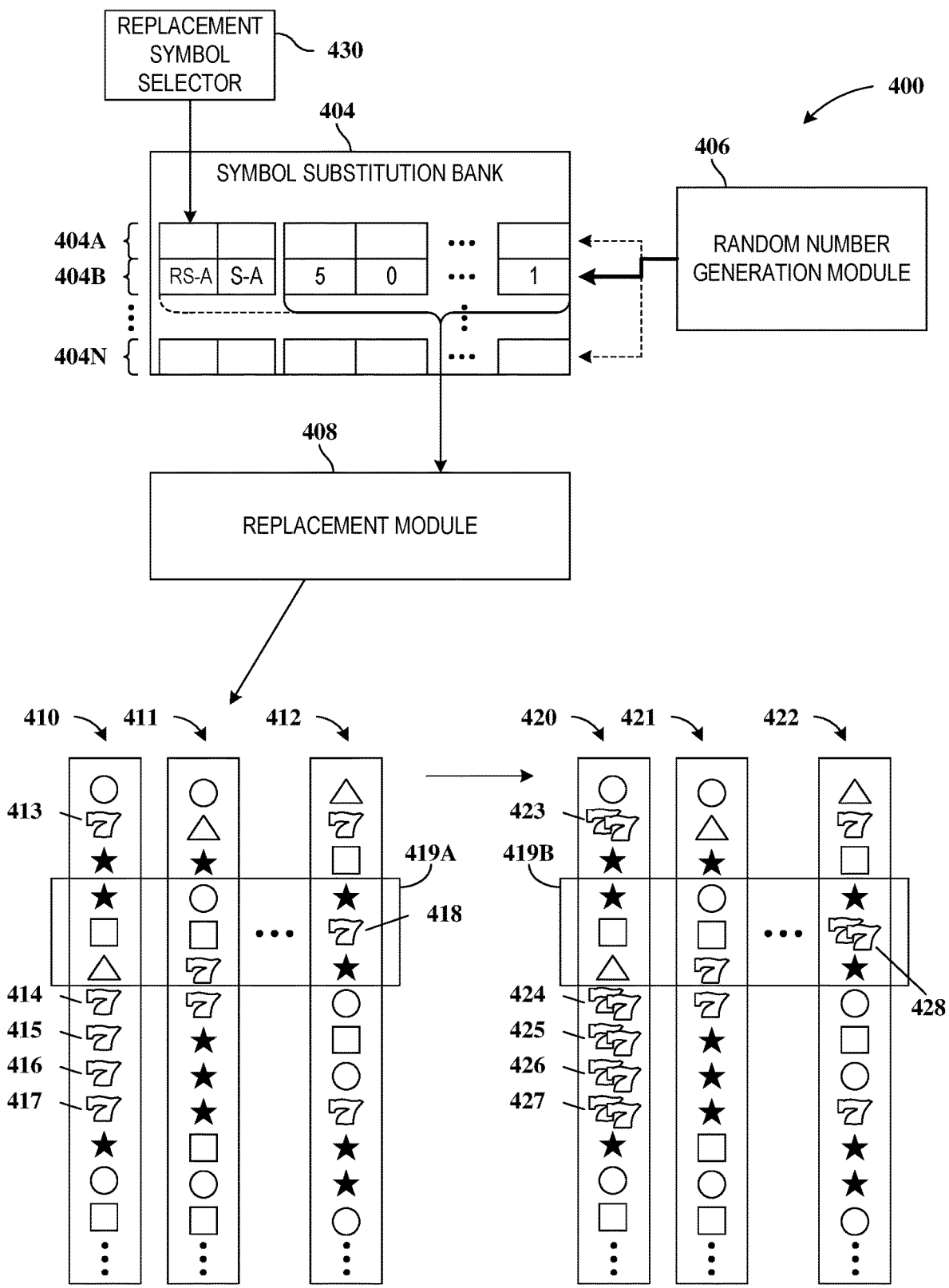
FIG. 4 is an embodiment of an operational arrangement of a gaming device to enhance symbols in a slot game on a spin-by-spin basis.

FIG. 4 is an embodiment of an operational arrangement of a gaming device 400 to enhance symbols in a slot game on a spin-by-spin basis. In this embodiment, it is assumed that one, some, or all single symbols of a slot game reel set will be replaced with symbols derived from the original symbols that are to be replaced. A derivative symbol in this regard may refer to a replacement symbol whose value or rank is different from, but based on the original symbol (e.g., a next higher-value symbol or other "nudge" of a symbol value). A derivative symbol may also refer to a replacement symbol that enables that original symbol to have a more favorable function. For example, in various embodiments, a derivative symbol may involve changing a symbol S1 to a double-symbol D1 that functions as if two consecutive S1 symbols had appeared on a payline or in a scatter pay, or expanding a symbol into neighboring symbol locations, or replacing with a wild symbol or other symbol potentially more likely to result in a payout or higher payout, or replacing with or including a multiplier or other modifier at one or more symbol locations to enhance payouts, etc.

In the illustrated embodiment, it is assumed that one, some, or all single symbols of the slot game reel set will be replaced with double symbols, although any symbol replacement is equally applicable in view of the disclosure herein. In some embodiments, a double symbol counts as two symbols. For example, four star symbols in a row, in three respective slot symbol locations, may provide a payout to the player. However, if the first such star symbol was a double star symbol (e.g., two stars at the same slot symbol location), then only two more single star symbols would be needed to reach a four-symbol payout, which could be accomplished with a total of three symbol locations rather than four symbol locations. Thus, changing/enhancing a single symbol to a double symbol may be advantageous to the player, since a lesser number of like symbols in consecutive symbol locations would be needed to reach a payout result that would otherwise require a higher number of such symbols in consecutive symbol locations. Thus, for purposes of the example of FIG. 4, symbol substitutions to double symbols will be assumed, although the principles are equally applicable to any type of symbol substitution, such as multipliers or other payout modifiers, wild symbols, random symbols, etc.

In this embodiment, a plurality of original slot game reels 410, 411, 412 each include strings of symbols. The gaming device 400 may be configured to facilitate replacement of one or more of the symbols on one or more of the reels 410, 411, 412 to provide corresponding set of resulting modified reels 420, 421, 422. The boundary 419A represents a possible resulting window of viewing, such as a display device, which exhibits a playable portion of the reels 410, 411, 412 to the player prior to symbol modification. Analogously, the boundary 419B represents a possible resulting window of viewing, such as a display device, which exhibits a playable portion of the resulting modified reels 420, 421, 422 to the player after symbol modification has taken place. The replacement of such symbols may be controlled by way of, for example, the symbol substitution bank 404, which includes a plurality of symbol enhancement alternatives or sets 404A, 404B, through 404N.

Which, if any, of the sets 404A, 404B, 404N will be selected to update one or more of the reels 410, 411, 412 to the resulting modified reels 420, 421, 422 may be controlled by an event generator configured appropriately. In the illustrated embodiment, the event generator is implemented as a random number generation module 406 that generates random numbers. Each of the symbol enhancement sets 404A, 404B, 404N may be associated with a number, or a number range, such that it is selected when the random number generation module 406 outputs a number. For example, the random number generation module 406 may randomly generate one hundred numbers, where each of the symbol enhancement sets 404A, 404B, 404N are each associated with a particular range of numbers. If the number generated by the random number generation module 406 falls within the weighted range of numbers of one of the symbol enhancement sets 404A, 404B, 404N, then the respective one of the symbol enhancement sets is selected, and made available for the replacement module 408 to modify the appropriate reels 410, 411, 412 to provide modified reels 420, 421, 422 for that particular player turn or "spin." In one embodiment, the weight assigned to any particular symbol substitution set therefore relates to the relative likelihood of that particular symbol substitution set being selected relative to the other selection choices.

In this example, assume that the random number generation module 406 generated a number that ultimately identifies symbol substitution set 404B. Assume that the symbol substitution set 404B indicates that five (5) symbols are to be changed on reel 410, zero (0) symbols are to be changed on reel 411, and one (1) symbol is to be changed on reel 412. In one embodiment, additional information may be provided, such as a placement map, to identify specifically which symbols on the reels 410, 411, 412 are to be replaced. In other embodiments, the symbol types to be replaced may be provided, but the specific positions are not, such that random ones of the specified number of symbol replacements will occur. For example, if the symbol type is a star symbol, and there are 10 star symbols on reel 410 but only 5 star symbols are to be updated/enhanced, five of the ten may be randomly selected, or the first five on the reel may be replaced, or consecutive groups of a plurality of such symbol may be given replacement priority, etc.

In the illustrated embodiment, five symbols are to be replaced on reel 410, and one symbol is to be replaced on reel 412. In one representative embodiment, the five symbols to be enhanced on reel 410 are selected randomly, and are shown as symbols 413, 414, 415, 416, 417, and the single symbol to be enhanced on reel 412 is selected randomly as symbol 418. As previously indicated, this particular embodiment assumes that symbols to be enhanced by the replacement module 408 will be enhanced with double symbols of the same type. Thus, in the illustrated embodiment, the "7" symbols 413, 414, 415, 416, 417 and 418 will be replaced with "double 7" symbols, as depicted as double symbols 423, 424, 425, 426, 427 on modified reel 420 and double symbol 428 on modified reel 422. This new reel configuration on modified reels 420, 421, 422 will be used for the particular "spin" of the reels by the player, and awards will be based at least on symbol presentations and/or symbol relationships in response to those modified reels 420, 421, 422.

The symbol substitution sets may also include information as to which symbol(s) will replace the targeted symbol(s). In the example of FIG. 4, it was known that double symbols will replace single symbols, so no such field in the symbol substitution sets 404A, 404B, 404N would be needed (although may still be used in other embodiments). For example, if a replacement symbol RS-A was to be configured to replace a symbol S-A, then the replacement symbol RS-A could be included in the symbol substitution set 404B. In some embodiments, a replacement symbol selector 430 may be utilized to enable static or dynamic changes to the symbol(s) that will serve as the replacement symbol(s), which can select symbols based on one or more game features, or randomly, etc. The symbol S-A could also be included in the symbol substitution set 404B, if (for example) it was not fixed or otherwise known.

Another example is now provided in connection with FIGS. 5A, 5B and 5C, which depict a representative symbol substitution bank 500 in the form of Table-A in this example, an original symbol set 502 on five reels, and a modified symbol set 504 resulting from application of the symbol substitution bank to the original symbol set 502. FIG. 5A depicts Table-A, which includes a plurality of defined symbol substitution sets, also referred to herein as "cases." Such cases may be determined in advance, or alternatively determined in response to a play event(s), and/or at the time of symbol modification, or randomly, etc.

In the representative example of FIG. 5A, a first case 506 would affect two different symbols, identified in case 506 as M1 and M2 symbols. Regarding the M1 symbols, no symbols would be changed from M1 symbols on Reel1 520A, two symbols would be changed from M1 symbols on Reel2 522A, two symbols would be changed from M1 symbols on Reel3 524A, two symbols would be changed from M1 symbols on Reel4 526A, and two symbols would be changed from M1 symbols on Reel5 528A (see case 506, row M1). Regarding the M2 symbols of case 506, five symbols would be changed from M2 symbols on Reel1 520A, no symbols would be changed from M2 symbols on either Reel2 522A or Reel3 524A, one symbol would be changed from an M2 symbol on Reel4 526A, and two symbols would be changed from M2 symbols on Reel5 528A. For this particular example, it is assumed that symbols that are to be changed will be changed to double symbols of the same symbol, such as a single star being changed to a double star symbol that can count as two star symbols. Stated differently, in this example, M1 symbols to be changed will be changed to D1 symbols (where "D1" represents a double symbol of an "M1" symbol), and M2 symbols to be changed will be changed to D2 symbols (where "D2" represents a double symbol of an "M2" symbol).

Therefore, based on which symbol substitution set ("case") is selected, different symbols on different reels of the original reel set 502 may be identified for replacement. Examples of how the various cases 505, 508, 510, 512 and 514 may be used are now described, with reference to the reels of the original reel set 502 (but without detailing specific symbol replacements, until a later example). If the first case 506 is selected, the original symbol set 502 will be changed to a modified symbol set 504 such that two M1 symbols are changed to D1 symbols on each of Reel2 522A, Reel3 524A, Reel4 526A and Reel5 528A, five M2 symbols are changed to D2 symbols on Reel1 520A, one M2 symbol is changed to a D2 symbol on Reel4 526A, and two M2 symbols are changed to D2 symbols on Reel5 528A (symbol replacements not shown in this example). The modified symbol set 504 would then be used for the particular gaming event (e.g., "spin"). A second case 508 under these representative assumptions would result in two M1 symbols being changed to D1 symbols on each of Reel1 520A, Reel3 524A, Reel4 526A, and Reel5 528A. A third case 510 under these representative assumptions would result in two M2 symbols being changed to D2 symbols on each of Reel2 522A, Reel3 524A, Reel4 526A, and Reel5 528A. A fourth case 512 under these representative assumptions would result in two M2 symbols being changed to D2 symbols on each of Reel1 520A, Reel3 524A, Reel4 526A, and Reel5 528A, and in one M3 symbol being changed to a D3 symbol on each of Reel 3 524A, Reel4 526A and Reel5 528A. Finally, a fifth case 514 under these representative assumptions would result in no changes on the reels of the original symbol set 502. Symbol replacements are not identified on the original reel set for this example, however such symbol replacements are depicted in an example below.

Thus, a random selection of one of a plurality of cases 506, 508, 510, 512, 514 may be made, and based on that selection, the original symbol set 502 will be changed accordingly to arrive at a modified symbol set 504. This random selection may be entirely random, weighted towards certain results, or otherwise manipulated to enable selections to be as desired. An example is now provided, which depicts symbol replacements from the original reel set 502 to arrive at the modified reel set 504 based on selection of one of the symbol substitution sets. For purposes of this example, it is assumed that each of the various symbol substitution sets/cases, 506, 508, 510, 512 and 514 are weighted as shown by the weight column 516 of Table-A 500 of FIG. 5A. Specifically, this example, assumes a 24% chance that each of cases 506, 508, 510, and 512 will occur, and a 4% chance that case 514 will occur. In one embodiment, a random event selection module (e.g., random event selection module 306 of FIGS. 3A/3B) is configured to carry out selection of the symbol substitution sets 506, 508, 510, 512, 514 based on a predetermined or dynamically-determined weight associated with each case, and thus the "weight" shown on Table-A 500 is merely provided for ease of description (although the weight for each case could be provided with each case in the symbol substitution sets 500).

For purposes of this example, it is also assumed that case 508 was selected for a current reel spin event. This case 508 under these representative assumptions results in two M1 symbols being changed to D1 symbols on each of Reel1 520A, Reel3 524A, Reel4 526A, and Reel5 528A. In one embodiment, the number of symbols to be replaced on a given reel may match the number of such symbols available on that reel, in which case all of the symbols of that type are changed. In other embodiments, the number of symbols to be replaced on a given reel may be less than the total number of such symbols available on that given reel, in which case a subset of the total symbols of that type are changed. Such a subset of symbols may be specifically designated (e.g., change these two particular symbols at these particular locations on that reel), or may be randomly chosen (e.g., change any two symbols of that type on the reel), or may be selected using weighting or otherwise. In this example, it is assumed that symbols of the type to be replaced are randomly chosen on the respective reel for replacement.

In the present example assuming selection of case 508, it is assumed that two randomly-selected single symbols M1 530 and M1 532 on Reel1 520A of the original symbol set 502 will be replaced by double symbols of the same type, arriving at modified double symbols D1 534 and D1 536 at the resulting Reel1 520B of the modified symbol set 504. In an analogous manner, symbols M1 540 and M1 542 on Reel3 524A of the original symbol set 502 will be replaced to double symbols resulting in D1 544 and D1 546 at the resulting Reel3 524B of the modified symbol set 504. Symbols M1 550 and M1 552 on Reel4 526A of the original symbol set 502 will be replaced to double symbols resulting in D1 554 and D1 556 at the resulting Reel4 526B of the modified symbol set 504. Finally, symbols M1 560 and M1 562 on Reel5 528A of the original symbol set 502 will be replaced to double symbols resulting in D1 564 and D1 566 at the resulting Reel5 528B of the modified symbol set 504.

Thus, when generating a weighted random number based on the weights in Table-A 500, case 508 would be selected 24% of the time. This would correspond to the reel strips in Table-B 502 being changed to the reel strips in Table-C 504 for that spin. As previously noted, if so chosen, the reel strips could be played with no changes, represented by case 514 in this example.

As the example of FIGS. 5A, 5B and 5C illustrates, based on the weighted selection of a case 506, 508, 510, 512, 514, the original symbol set 502 can be modified as instructed by the selected symbol substitution set ("case") to provide the modified symbol set 504 for use in a particular reel spin of a slot game. Such selection may be made on any one, more, or all spins associated with a slot game or other similar gaming event. Rather than changing to another symbol, the original symbol could change to something different, such as a payout modifier. A multiplier is an example of a payout modifier, and a symbol or set of symbols can be randomly selected, and placed on reels, and changed to a multiplier in an analogous fashion as described above for symbol-to-symbol replacement. The placement map described above may relate to the placement of symbols on reels and identification of the proper reel. The placement of the symbols can be random, and may be of the same symbol type (e.g., M1 to double-M1, referred to herein as D1), within each reel. Alternatively, this could be changed to select specific mapping on each individual reel strip. Or location-dependent versus type-dependent. A D1 or other D# double symbol as used herein may represent any symbol with a double image of a symbol. It may be related to the single version of that symbol image, by way of paytable evaluation and payouts. An individual "double" symbol may represent two single symbols. In other embodiments, an individual double symbol may represent a special symbol that acts differently than its counterpart symbol with a single symbol image, such as providing a higher or different payout when used in connection with other symbols, whether matching symbols or not, enabling smaller symbol combination payouts (e.g., a 2-symbol combination of a D1 and M1 may provide a payout, where the D1 is a single symbol with two M1 images on it), etc.

Figure 6:
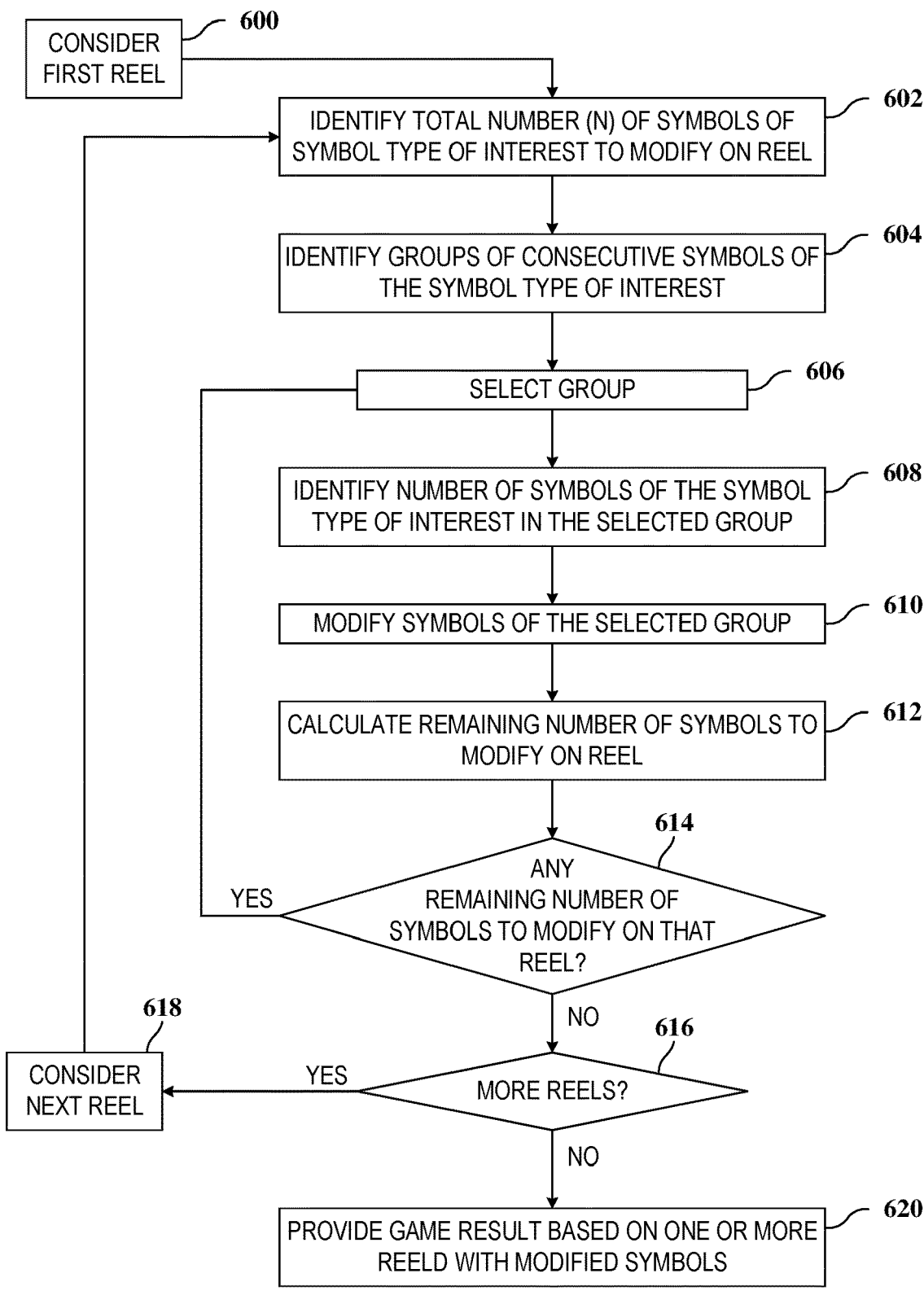
FIG. 6 depicts one representative manner for selecting symbols on a reel for replacement, while tending to retain stacks of like symbols on modified reels if a symbol from a stack on the original reel is to be replaced.

In one embodiment, for a particular symbol type that is to be changed (e.g., M1 symbol to D1 symbol) there may be a desire to have consecutive strings of such symbols, sometimes referred to herein as a "stack" of like symbols, all be changed together, so that any such consecutive string/stack remains as a stack of like symbols. For example, assume a reel was configured with symbols S1, S2, S3, S4, S2, S2, S2, S2, S5, S6, S7, S8, to which there is a string of four S2 symbols in a row. In one embodiment, it may be desirable that if any of such symbols in that string/stack is modified, then all of the symbols will be modified, so that the stack of like symbols remains intact, just with modified symbols. FIG. 6 depicts one representative manner for selecting symbols on a reel for replacement, while ensuring (or at least encouraging to some extent) that strings of like symbols remain a string of like symbols after symbol enhancement/modification. Stated alternatively, this embodiment illustrates one manner for selecting symbols on a reel for replacement, while tending to retain stacks of like symbols on modified reels if any symbol from a stack on the original reel is targeted for replacement.

Referring now to the example of FIG. 6, a first reel of a multi-reel symbol set is considered 600. In this example, consecutive symbols of one symbol or more are each considered "groups" of symbols. The total number (N) of symbols, of the symbol type of interest, are identified 602 that are to be modified on the particular reel. For example, it may be desired to modify twenty S1 symbols (i.e. S1 represents the symbols of symbol type of interest) to some other symbol on the first reel. In order to allow stacks of symbols to be modified to remain as a stack of modified symbols, the illustrated embodiment identifies 604 groups of consecutive symbols of the symbol type of interest (e.g., identify consecutive strings of one or more S1 symbols on the first reel). A first of those groups may then be selected 606, which may be selected entirely randomly, in a weighted fashion, or selected in any desired manner. The selected group could have just one S1 symbol, or two consecutive S1 symbols, or more consecutive S1 symbols. The number of symbols of the symbol type of interest in the selected group is identified 608. For example, if the selected group of S1 symbols has only one consecutive S1 symbol, the identified number of such symbols would be one. If the selected group of S1 symbols has two consecutive S1 symbols, then the identified number of such symbols would be two, and so forth.

In this embodiment, when the group has been identified 608, those symbols of the selected group are modified 610. Since symbols are being modified in groups of consecutive like symbols, stacks of an original symbol that is targeted for replacement will remain a stack of the new, replacement symbols. The remaining number of symbols to modify on that reel is calculated 612, such as by subtracting the identified number of symbols in the selected group from the number of symbols yet to modify. If after calculating 612 it is determined 614 that there are any remaining symbols to modify on that reel, another group is selected 606, and the process continues until the number of symbols identified 602 to replace on that reel have been modified. When it is determined 614 there are no further symbols to modify for that reel, if there are more reels, the next reel is considered 618, and the number of symbols of the symbol type of interest to modify on that next reel is identified 602. The process at blocks 606-614 continues until there are no more symbols to modify on that reel, and the process at blocks 602-616 continues until all symbols have been replaced on all reels of interest. At this point, the reels have been modified as desired, and the game result based on any reels with modified symbols is provided 620.

The example set forth in FIG. 6 depicts one representative manner in which symbols on an original reel(s) may be selected for enhancement or other modification, particularly where a consecutive series of the target symbols are to be replaced. However, other manners for selecting and modifying symbols may be implemented. Additionally, the selection and replacement may be entirely random, or in other cases guided with certain probabilities, such that (for example) twenty S1 symbols can be located on a reel and enhanced with other symbols, whether or not they are associated with consecutive strings, etc.

Symbols may be enhanced or otherwise modified with any symbols desired. In some examples disclosed herein, symbols were assumed to change to double symbols of themselves, such as a star symbol being enhanced to a double-star symbol. However, symbols may be enhanced or otherwise modified to any symbol, whether a more favorable symbol to the player, or a less favorable symbol to the player, on a particular spin or other gaming event. The modification symbols, i.e. those replacing other symbols, may be multipliers or other modifiers, wild symbols, high-value symbols (or higher-value symbols than those targeted for replacement), operational or functional symbols, etc., and the modification to double symbols is merely an example. In some embodiments, a replacement symbol selector may be utilized to enable static or dynamic changes to the symbol(s) that will result from a symbol change, as depicted by the replacement symbol selector 430 shown in FIG. 4.

Figure 7A:
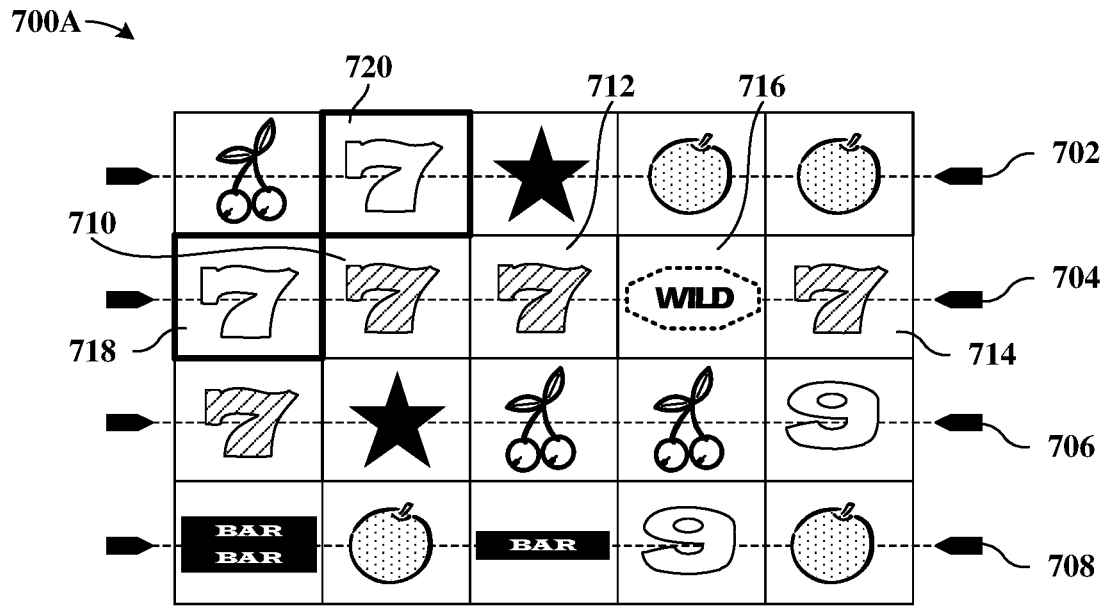
FIGS. 7A and 7B depict examples of a slot game results without and with symbol replacement respectively.
Figure 7B:
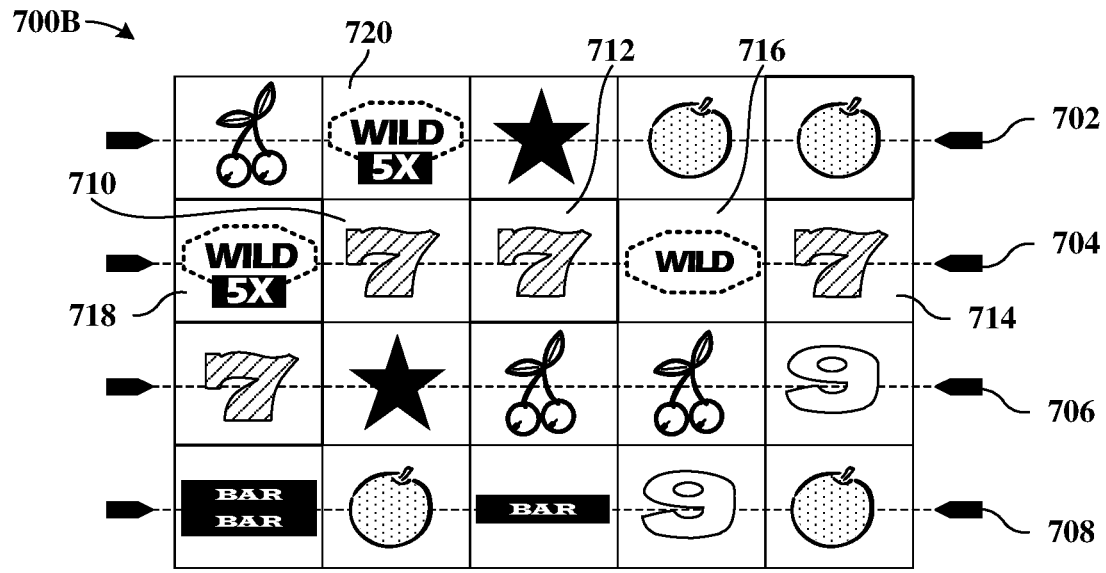

FIGS. 7A and 7B depict examples of a slot game results without and with symbol replacement respectively. FIG. 7A depicts what a slot game result might be where no symbol replacement occurs. The slot game grid 700A includes a plurality of symbol locations with symbols presented therein, and may include any number of paylines or other rules to identify when an award or other asset may be provided to the player. The slot game grid 700A may present "reels" of symbols, whether such reels are on a grid column basis, individual symbol locations, or otherwise. In the illustrated embodiment, four paylines are depicted for purposes of illustration, including paylines 702, 704, 706, 708. In this example, three colored seven symbols are on payline 704 at symbol locations 710, 712, 714, as is a wild symbol at symbol location 716. It is assumed that no winning condition occurred on payline 704, since the first symbol at symbol location 718 on the payline 704 was not a matching colored seven symbol or wild symbol.

However, assume a symbol substitution bank had been employed, such as symbol substitution bank 404 of FIG. 4, where some or all blank seven symbols were to be changed to wild symbols for this particular spin. In such a case, a slot spin outcome such as shown in FIG. 7B may result. In such case, blank seven symbols at symbol locations 718, 720 would be replaced on their respective reels (e.g., columns incorporating symbol locations 718, 720 respectively), with wild symbols, which are 5x-wild symbols in this example (i.e. a wild symbol, plus providing a five times multiplier for payouts on paylines including respective symbol locations 718, 720). As the spin result in slot game grid 700B depicts, the replaced symbols at symbol location 718, 720 result in a winning condition on payline 704, which is a string of five consecutive colored seven symbols (including wild symbols) at symbol locations 718, 710, 712, 716, and 714. In accordance with one embodiment, the replacement of blank seven symbols with wild symbols would expire at the end of the spin result or other gaming activity result, making way for a new symbol replacement, or no symbol replacement, in the next spin and ensuing spins. In this manner, guided and/or random symbol replacement on a spin-by-spin basis enables player excitement, operator control, and/or other advantages.

Figure 8A:
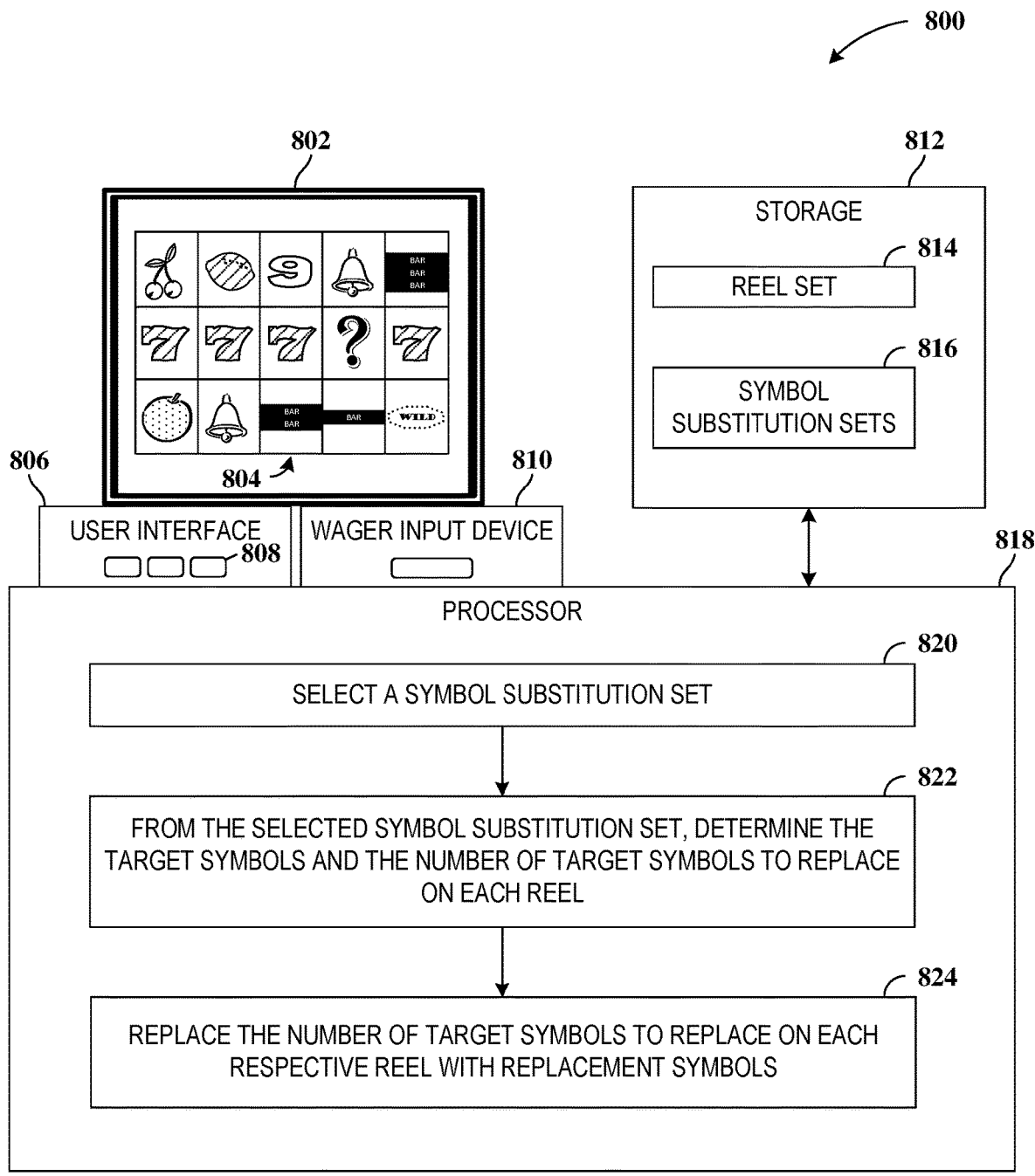
FIGS. 8A, 8B, and 8C are block diagrams of representative gaming apparatuses for enhancing, transforming, or replacing symbols in a gaming symbol grid.
Figure 8B:
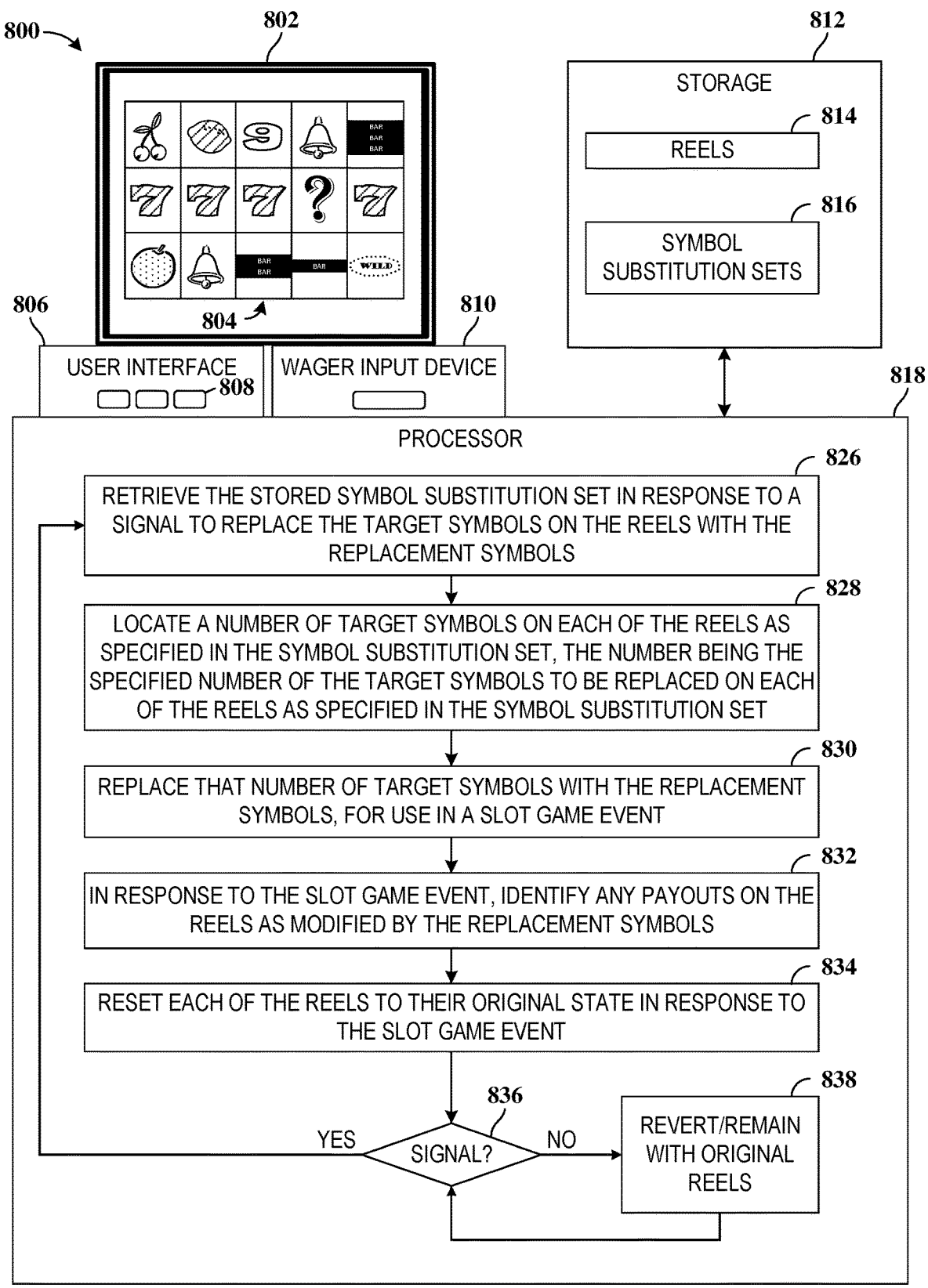
Figure 8C:
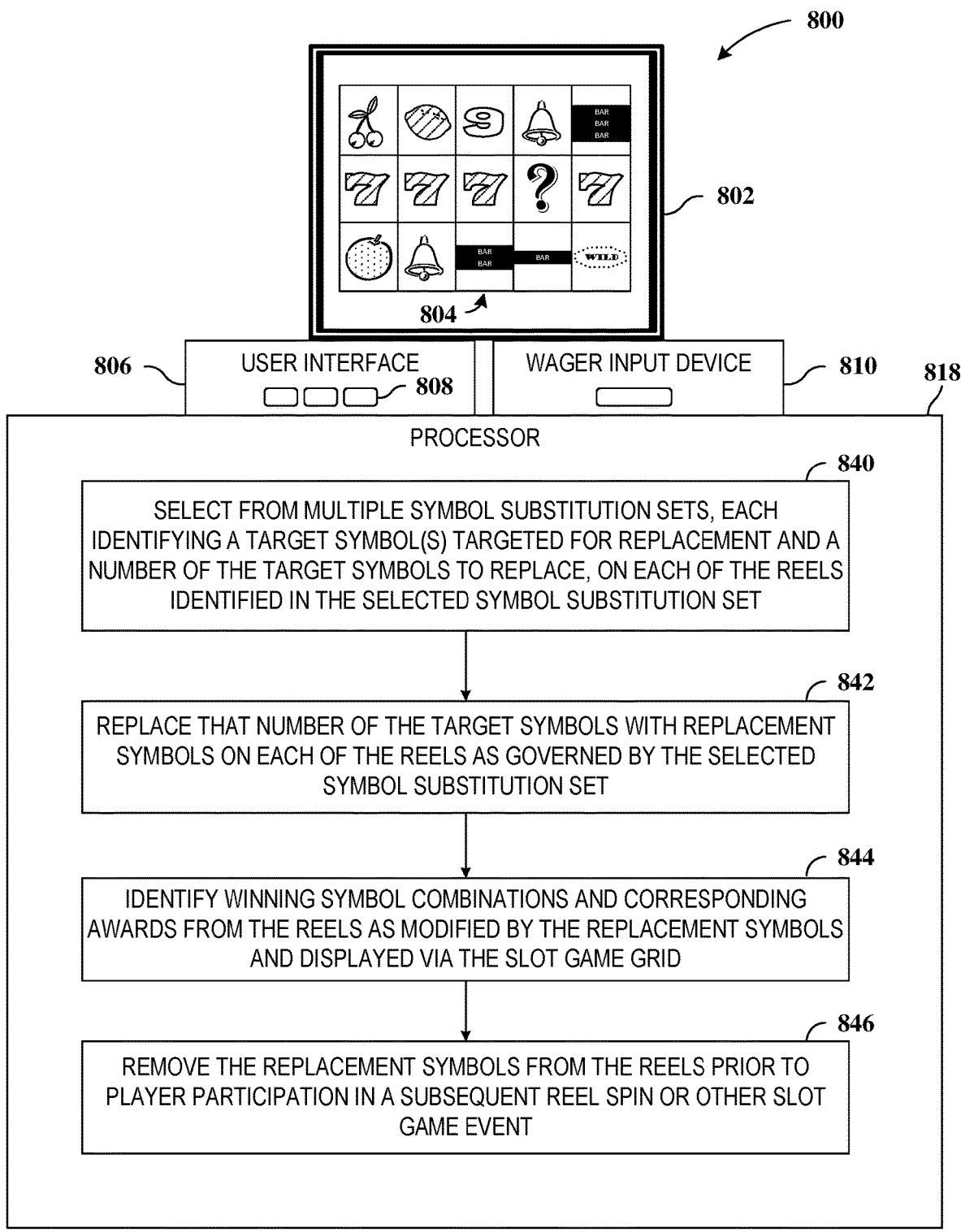

FIGS. 8A, 8B, and 8C are block diagrams of representative gaming apparatuses for enhancing, transforming, or replacing symbols in a gaming symbol grid. In the embodiment of FIG. 8A, a slot game device 800 is provided on which players can play slot games. Other games may instead be used as a primary game, such as poker, etc. The representative slot game device 800 includes at least a display 802 presenting a slot game symbol array or "grid" 804 of symbols, a user interface 806 including at least one user input 808 to enable a player to initiate a slot game event presented via the slot game grid 804, and a wager input device 810 structured to identify and validate player assets and ultimately permit the player to play the slot game event when the player assets are provided.

The representative slot game device 800 further includes storage 812 to store information related to the gaming activity. In the illustrated embodiment of FIG. 8A, the storage stores a reel set(s) 814 that includes a plurality of slot game reel arrangements or other manner of randomizing a presentation of symbols. In the illustrated embodiment, a portion of the reel set is displayed on the display 802 as the array or grid 804 of symbols. The storage 812 may further store a symbol substitution or replacement bank, including a plurality of symbol substitution sets 816. Each of the symbol substitution sets 816 in this embodiment identify one or more target symbols of the reel set 814 that are targeted for replacement, and also each specify a number of the target symbols to replace on each of the plurality of reels of the reel set 814. It should be noted that not all of the reels of the reel set 814 may involve symbol replacement, and thus other embodiments may identify which (if any) of the reels are to receive replacement symbols.

The slot game device 800 also includes a processor 818 configured to select (at least) one of the symbol substitution sets, and in response to the information in the selected symbol substitution set, to determine 822 which symbols to replace ("target symbols") and how many of such target symbols are to be replaced. Thus, the processor causes information, regarding the target symbols and number of target symbols to be replaced, to be retrieved from the selected symbol substitution set 816. This can vary depending on which symbol substitution set 816 was selected 820. The processor 818 of the present example is further configured to replace 824 the specified number of the target symbols on each respective reel with replacement symbols.

The slot game device 800 configures the processor 818 (which may include one or more cooperative processing devices) to structurally program functional elements into hardware modules. Processor 818 circuitry configuration thus changes based on the modules developed by stored software to carry out the desired methodology. For example, the processor 818 is programmed by software/code to create a hardware-based module to select symbol substitution sets 820 and to create other such software/code modules for each of the operations 820-824.

Other structural modules may be created on the slot game device using a properly configured processor 818. Referring now to the example of FIG. 8B, the processor 818 may be configured into programmed modules to retrieve 826 the stored symbol substitution set, in response to a signal to replace the target symbols on the reels with the replacement symbols of the symbol substitution set. The programming modules may further locate 828 a number of the target symbols on each of the reels as specified in the symbol substitution set, the number being the specified number of the target symbols to be replaced on each of the reels as specified in the symbol substitution set. The programming modules may further replace 830 the number of located target symbols with the replacement symbols for use in a slot game event. In response to the slot game event, payouts are identified 832 on the reels as modified by the replacement symbols, and each of the reels is reset 834 to its original state. Until another signal is received as determined at block 836, the original reels will be used as shown at block 838.

In one embodiment, the reels remain in their original state (i.e. original symbols and sequence on each of the reels) until receiving another signal 836 to replace the target symbols on the reels with replacement symbols. This would trigger another symbol substitution event for another reel spin. The signal can be a random notification signaling a request to enable the symbol replacement for that reel spin, or can be provided as a result of a triggering event during play of the slot game event (e.g., a symbol combination; an awarded feature; etc.), or the like.

Still other structural modules may be created on the slot game device using a properly configured processor 818. In one embodiment shown in FIG. 8C, a slot game includes a display presenting a slot game grid, slot game reels each having symbols associated therewith, a user interface including user inputs to allow a player to initiate a slot game event presented via the slot game grid, and a wager input device structured to identify and validate player assets and permit the player to play the slot game event when the player assets are provided. The slot game further includes a processor 818 configured into programmed modules to select 840 from multiple symbol substitution sets, each identifying a target symbol(s) targeted for replacement and a number of the target symbols to replace, on each of the reels identified in the selected symbol substitution set. The programmed modules may replace 842 that number of the target symbols with replacement symbols on each of the reels as governed by the selected symbol substitution set. The programmed modules may also identify 844 winning symbol combinations and corresponding awards from the reels as modified by the replacement symbols and displayed via the slot game grid, and remove 846 the replacement symbols from the reels prior to player participation in a subsequent reel spin or other slot game event.

The disclosure provided herein is also applicable in other gaming contexts. For example, in a poker context, a plurality of symbol substitution sets, more particularly card substitution sets, each having one or more cards associated therewith, and in some embodiments an indication of where in the deck(s) of cards will replace existing cards. As a more particular example, additional "2" cards in a poker game where "2" cards are wild, could replace other cards. In other embodiments, the symbol substitution sets may include one or more cards to add to the deck(s) of cards that provide the source of the poker hand(s) being played by the player, such as to randomly add one or more high value cards in response to the selection of a symbol substitution set that identifies such high-value card(s) addition. For example, a number of symbol substitution sets may be provided that respectively include additional Aces, additional Kings, etc., and a random selection of one of the symbol substitution sets. As another example, additional "2" cards in a poker game where "2" cards are wild, could be added to the deck(s) that source the poker hand(s), to randomly (for example) increase the chances of getting a wild card(s) on particular played hands. Thus, allowing cards of the source deck(s) to have cards replaced and/or added, depending on which of a plurality of card substitution sets is selected, can provide entertaining variations to standard poker play. The principles described herein are equally applicable to such card games, and references to "symbols" and other slot game characteristics are equally applicable to "cards" and other poker game characteristics.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above.

What is claimed is:

1. A slot game apparatus comprising:
   a reel set comprising a plurality of reels, each having a plurality of symbols associated therewith;
   a plurality of symbol substitution sets, each identifying one or more target symbols of the reel set targeted for replacement, and each specifying a number of the target symbols to replace on each of the plurality of reels;

a random event selection module configured to select one of the plurality of symbol substitution sets, and in response, to retrieve the respective identified one more target symbols and the specified number of the target symbols to replace on each of the plurality of reels; and a symbol replacement module configured to replace the retrieved specified number of the retrieved identified target symbols on each respective one of the plurality of reels with replacement symbols using rules identifying priorities of which of the retrieved identified target symbols will be replaced with the replacement symbols.

2. The slot game apparatus of claim 1, wherein the random event selection module is configured to select any one of the plurality of symbol substitution sets in connection with each randomization and presentation of the reel set.

3. The slot game apparatus of claim 2, wherein the random event selection module is configured to select any one of the plurality of symbol substitution sets based on assigned relative likelihoods of selection among the plurality of symbol substitution sets.

4. The slot game apparatus of claim 2, wherein the random event selection module is configured to randomly select any one of the plurality of symbol substitution sets.

5. The slot game apparatus of claim 1, wherein the reel set is reset to its original configuration prior to the next selection by the random event selection module.

6. The slot game apparatus of claim 1, wherein one or more of the plurality of symbol substitution sets further includes information specifying particular ones of the identified target symbols to be replaced among a total of the target symbols in the reel set.

7. The slot game apparatus of claim 1, wherein one or more of the plurality of symbol substitution sets further includes information specifying particular positions on the plurality of reels in which the retrieved identified target symbols are to be positioned in place of the symbols originally at those particular positions.

8. The slot game apparatus of claim 1, wherein one or more of the plurality of symbol substitution sets further includes an identification of the replacement symbols to be used to replace the target symbols.

9. The slot game apparatus of claim 1, wherein the replacement symbols are predetermined for each of the one or more target symbols of the reel set targeted for replacement.

10. The slot game apparatus of claim 9, wherein the replacement symbols are double symbols of the target symbols being replaced.

11. The slot game apparatus of claim 1, wherein one or more of the plurality of symbol substitution sets specifies a number of zero of the target symbols to replace on one or more of the plurality of reels.

12. The slot game apparatus of claim 1, wherein the reel set comprises a virtual reel set, and further comprising storage to store the reel set and the plurality of symbols associated therewith.

13. The slot game apparatus of claim 1, wherein the random event selection module comprises a random number generator, and wherein each of the plurality of symbol substitution sets is associated with a number or range of numbers identifiable by an output of the random number generator.

14. A slot game device comprising:
a display presenting a slot game grid;
a plurality of slot game reels each having a plurality of symbols associated therewith, a portion of the slot game reels being presented via the slot game grid;
a user interface including at least one user input to enable a player to initiate a slot game event presented via the slot game grid;
a wager input device structured to identify and validate player assets, and to permit the player to play the slot game event when the player assets are provided; and
a processor configured to:
select from a plurality of symbol substitution sets, each identifying at least one target symbol targeted for replacement and a number of the target symbols to replace, on each of the reels identified in the selected symbol substitution set;
replace the number of the target symbols with replacement symbols on each of the reels as governed by the selected symbol substitution set and as governed by rules identifying priorities of which of the target symbols will be replaced with the replacement symbols;
identify winning symbol combinations and corresponding awards from the reels as modified by the replacement symbols and displayed via the slot game grid; and
remove the replacement symbols from the reels prior to player participation in a subsequent one of the slot game events.

15. The slot game apparatus of claim 14, wherein each of the plurality of symbol substitution sets is assigned a likelihood of being selected relative to the other ones of the symbol substitution sets, and wherein the processor is configured to select from the plurality of symbol substitution sets pursuant to the assigned likelihoods of being selected and the rules identifying the priorities.

16. A slot game device comprising:
a display presenting a slot game grid;
a user interface including at least one user input to enable a player to initiate a slot game event presented via the slot game grid;
a wager input device structured to identify and validate player assets, and to permit the player to play the slot game event when the player assets are provided;
reel storage configured to store a plurality of reels of a slot game, wherein each of the reels has a plurality of consecutive symbols associated therewith;
symbol substitution set storage configured to store a symbol substitution set identifying one or more target symbols on one or more of the reels to be replaced with one or more replacement symbols, and specifying a number of the target symbols to be replaced on each of the reels; and
a processor configured to:
(a) retrieve the stored symbol substitution set in response to a signal to replace the target symbols on the one or more reels with the one or more replacement symbols of the symbol substitution set;
(b) locate the target symbols on each of the reels as identified in the symbol substitution set, in a quantity corresponding to the specified number of the target symbols to be replaced as identified in the symbol substitution set;
(c) replace the quantity of located target symbols with the replacement symbols for use in a slot game event based on rules identifying a priority of which of the located target symbols are to be first replaced by the replacement symbols;

(d) in response to the slot game event, identify winning symbol combinations and corresponding awards on the one or more reels as modified by the replacement symbols;
(e) reset each of the reels to their original state in response to the slot game event; and
(f) repeat (a)-(e) in response to further occurrences of the signal.

17. The slot game device of claim 16, wherein the symbol substitution set storage is configured to store a plurality of the symbol substitution sets, each identifying respective ones of the target symbols and specifying a respective number of the target symbols to be replaced on each of the reels; and wherein the processor is further configured to select one of the plurality of symbol substitution sets in response to the signal, to retrieve the selected one of the symbol substitution sets, and to and perform (b)-(f) based on the target symbols and specified number of the target symbols to be replaced associated with the selected one of the symbol substitution sets.

18. The slot game device of claim 16, wherein the signal is provided randomly in connection with the slot game event.

19. The slot game device of claim 16, wherein the signal is provided in response to an event associated with participation in the slot game event.

* * * * *